United States Patent [19]

Rhodes

[11] 4,286,285

[45] Aug. 25, 1981

[54] CHECKERBOARD COLOR FILTER PROVIDING TOLERANCE

[75] Inventor: Roland N. Rhodes, Belle Mead, N.J.

[73] Assignee: RCA Corporation, New York, N.Y.

[21] Appl. No.: 118,213

[22] Filed: Feb. 4, 1980

[51] Int. Cl.³ .............................................. H04N 9/07
[52] U.S. Cl. ...................................................... 358/44
[58] Field of Search ...................................... 358/44, 43

[56] References Cited

U.S. PATENT DOCUMENTS 3,982,274  9/1976  Chai ........................................ 358/44

Primary Examiner—John C. Martin
Attorney, Agent, or Firm—Paul J. Rasmussen; William H. Meise; Henry I. Steckler

[57] ABSTRACT

A checkerboard filter for a single imager camera has rows that have alternately varying heights. This provides alignment tolerance with respect to a CCD imager to reduce color shift and flicker problems.

8 Claims, 2 Drawing Figures

CHECKERBOARD COLOR FILTER PROVIDING TOLERANCE

BACKGROUND OF THE INVENTION

The present invention relates to checkerboard type color encoding filters, and more particularly, to such filters when used with cameras having an array of discrete sensors such as a CCD (charge coupled device) having interlaced scan.

It is known to use checkerboard color encoding filters with cameras having single CCD imagers, such as is disclosed in U.S. Patent application No. 094,286, filed Nov. 19, 1979 (RCA 74,184) in the name of R. Rhodes. With such a filter, it is necessary that the registration of the checkerboard with respect to the photosensors on the CCD be essentially perfect, especially with regard to parallelness of the horizontal lines. If there is an error in the parallelness, the amount of a particular color over a discrete photosensor will change across a horizontal line, resulting in a color shift error when scanning, which is difficult to compensate. Further, if interlaced scan is used, the amount of color error due to said non-parallelness varies between the two interlaced fields. This results in 30 Hertz flicker in the color error when using an NTSC scanning standard.

It is therefore desirable to have a color filter which eliminates color shift and flicker problems.

SUMMARY OF THE INVENTION

In brief, this is achieved by having a color filter having horizontally repetitive sets of color areas, the height of a first group of said color areas of alternate rows being less than the height of said color areas of the second group of the remaining alternate rows.

DETAILED DESCRIPTION

Figure 1:
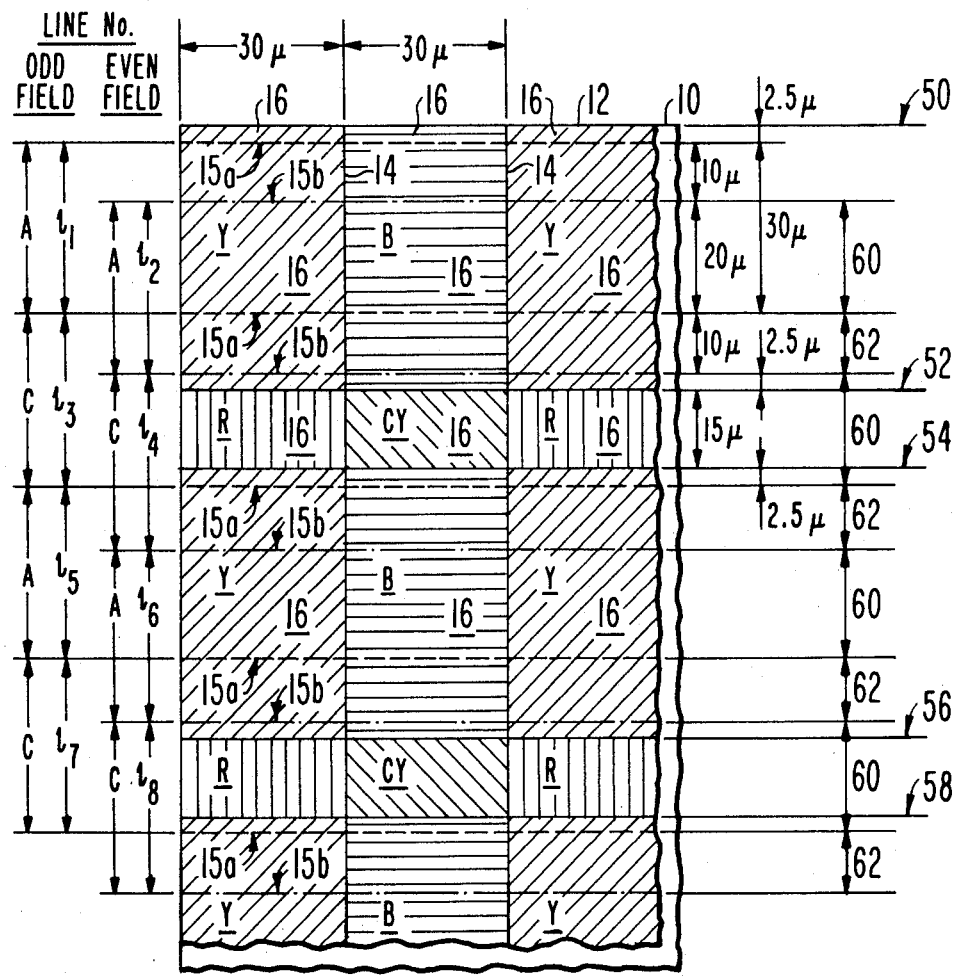
FIG. 1 shows an upper left portion of a horizontally and vertically repeating color filter for use with a three phase vertical transfer CCD imager.

FIG. 1 shows a CCD imager 10 having superimposed thereon the pattern of a color filter 12 in accordance with a first embodiment of the invention. The CCD imager 10 has a plurality of channel stops 14 that define the horizontal width, typically 30 microns, of the photosensing elements 16. Further, as explained in said prior application, each of the photosensors 16 have a vertical array of horizontally extending conductive stripes 15a and 15b. During charge accumulation due to illumination during the odd field, voltages are applied to horizontal stripes 15a, 15b in sets of three potentials, which defines the vertical dimensions of the photosensors 16 between stripes 15a. During the next even field in the embodiment shown, the position of the sets of three potentials are shifted down by one strip (10 microns), thus changing the effective vertical positioning of the photosensors 16 to between lines 15b. This shifting provides odd and even number scanning lines indicated in the column called "Line No." by the letter "L" with a subscript representing the line number, and thus the desired interlaced scanning. Further, this shifting provides overlap regions defined by the odd and even numbered lines that alternate spatially between 10 and 20 microns in height. In FIG. 1, the 20 micron high overlap regions are indicated by numerical 60, while the 10 micron overlap regions by the numerical 62. The output signals from the device are derived from a vertical shifting operation of the charges due to illumination in the columns of photosensors 16 into a register, then a vertical shifting operation into another register, and finally a horizontal shifting operation at the NTSC horizontal scanning rate out of the last register. Such a device is conventional and is known as "three phase vertical transfer device."

Turning now to the filter 12, it has a first row comprising yellow and blue color filter sections lying between horizontal lines 50 and 52 that cyclically repeat across the first horizontal row. The horizontal width of these yellow (Y) and blue (B) color filter sections is 30 microns, and their edges are aligned with vertical lines 14. The next row on the filter comprises red (R) and cyan (Cy) color filter sections lying between horizontal lines 52 and 54 that cyclically repeat horizontally across the second row of the filter. This second color filter row lies in the second from the top of the larger of the overlap regions 60 between the odd and even numbered fields and is 15 microns high, thus the height of the yellow and blue sections is 45 microns, since the sum of two rows must equal 60 microns, which is the height of two photosensors. Since the larger overlap region 60 is 20 microns high, this leaves a tolerance of 2½ microns above and beneath the red and cyan sections to allow for a total alignment tolerance of 5 microns either up, down, or skewwise. The third row comprises yellow and blue color filter sections between lines 54 and 56, while the fourth row again comprises red and cyan color filter sections between lines 56 and 58. It will be noted that the red and cyan rows repeat in spatially alternate rows of overlap regions 60.

The horizontal rows of red and cyan color filter elements could have been placed in the 10 micron overlap regions 62, e.g. between 15a and 15b, however, that would have made it much more difficult to fabricate the red and cyan color filter sections since they would have to then be only 5 microns high, assuming the same 2½ micron top and bottom tolerances.

Figure 2:
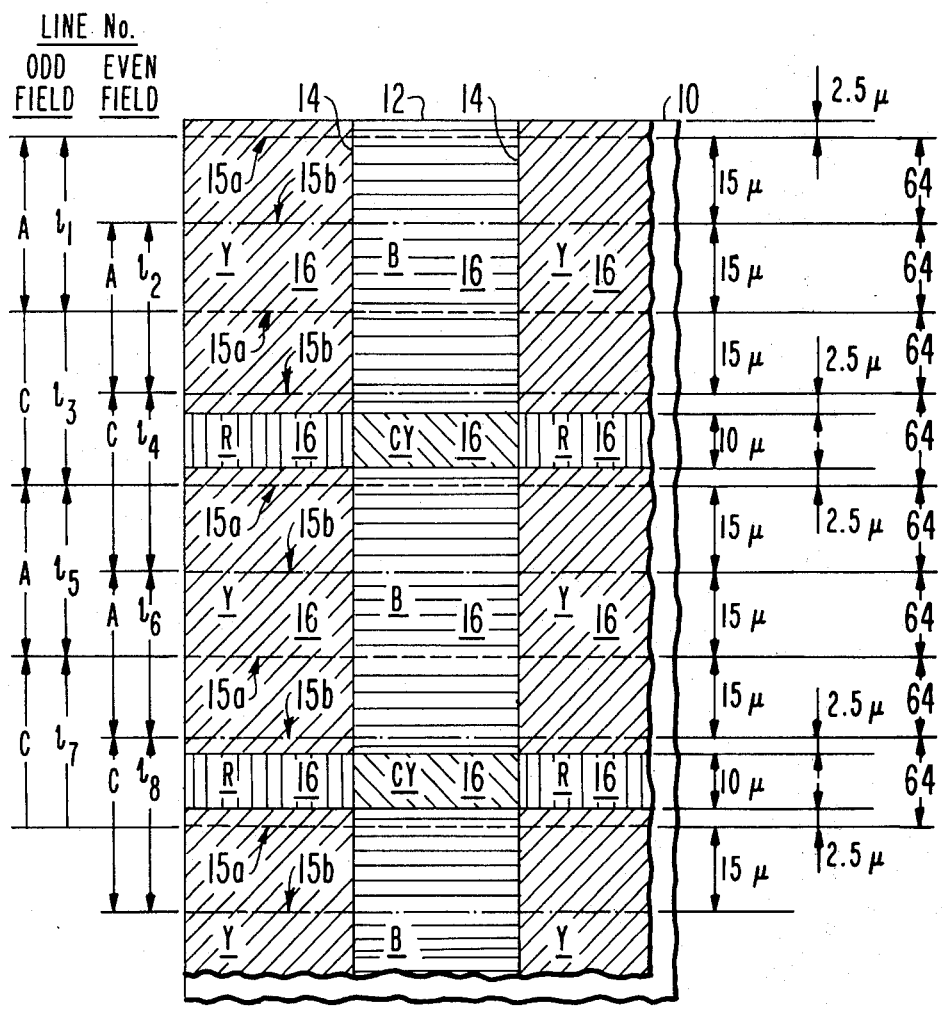
FIG. 2 shows a similar filter for use with a two phase vertical transfer CCD imager.

FIG. 2 shows a second embodiment of the invention for use with a two phase vertical transfer device, where corresponding elements have been given corresponding reference numerals. During charge accumulation due to illumination during the odd field, voltages are applied to horizontal stripes 15a and 15b in sets of two or four potentials, which defines the vertical dimension of the photosensors 16 between stripes 15a. During the next even field, the position of the sets of two or four potentials are shifted down by one or two stripes (15 microns) respectively, thus changing the effective vertical position of photosensors 16, which positions are shown in FIG. 2 by stripes 15b. In this embodiment all of the overlap regions 64 are 15 microns high. If the same top and bottom 2½ micron tolerance is to be achieved, it means the red and cyan filter sections must be 10 microns high, thus leaving 50 microns for the yellow and blue rows, since the total heights must again add up to 60 microns for two rows.

The readout of the signals from the CCD imager 10 is accomplished using demodulators, delay lines and a matrix as shown in FIG. 4 of said prior application except for different matrix equations.

It will be noted that in the present application, alternate rows of lines in both the odd and even fields are designate "A" and "C" respectively. The color composition of all "A" lines is the same regardless of field, similarly for the "C" lines. In the present case, the carrier readout of the A lines equals $R-B+G$, the carrier readout of the C lines equals $R-B$, and the luminance readout, $W=R+B+G$. From these equations, the matrix must solve the equations $G=A-C$, $R=W+2C-A$, and $B=W+C-A$.

What is claimed is:

1. A color filter for use with an image pickup device having a plurality of photosensors, said filter comprising rows of a plurality of horizontally repetitive sets of color areas, the height of a first group of said color areas of alternate rows being less than the height of said color areas of a second group of the remaining alternate rows.

2. A filter as claimed in claim 1, wherein said height of said first group is less than the height of the photosensors, and said height of said second group is greater than the height of the photosensors.

3. A filter as claimed in claim 2, wherein said height of said first group is approximately one-half of the height of said photosensors, and said height of said second group is approximately fifty percent greater than the height of said photosensors.

4. A filter as claimed in claim 3, wherein the height of said photosensors comprises 30 microns, said height of said first group comprises 15 microns, and said height of said second group comprises 45 microns.

5. A color filter as claimed in claim 1, wherein said first group comprises red and cyan color areas, and said second group comprises yellow and blue color areas.

6. A color filter as claimed in claim 1, wherein the image pickup device is operated in an interlaced mode wherein portions of vertically sequential scanning lines form overlap regions, said first group of color areas being disposed in some of said overlap regions.

7. A color filter as claimed in claim 6, wherein the height of said first group is less than the height of said overlap region in which it is disposed.

8. A color filter as claimed in claim 6, wherein some of said overlap regions have greater heights than the remaining overlap regions, said first group of color areas being disposed within said overlap regions of greater height.

* * * * *